Patented Jan. 4, 1944

2,338,464

UNITED STATES PATENT OFFICE 2,338,464

PROCESS FOR MAKING UREA-FORMALDEHYDE MOLDING COMPOSITIONS AND PRODUCT THEREFROM

Leonard Smidth, Houston, Tex.

No Drawing. Application December 20, 1938, Serial No. 246,804

14 Claims. (Cl. 260—9)

One object of my invention is to produce a superior hot molding composition by combining a cellulose material with a urea formaldehyde condensation product containing a high proportion of urea, such composition not staining ordinary steel molds nor requiring the use of stainless steel or chrome plated molds. Another object is to produce a homogeneous, translucent molded product by subjecting the above described molding composition to the combined action of heat and pressure. Other objects include improved processes of reacting and drying condensation products in the presence or absence of accelerating agents. Further objects include improved products which are treated to make shaped articles and also varnishes, lacquers, paints and enamels containing such synthetic products.

In my U. S. Patents Nos. 1,704,347 and 1,704,348, I show how to make urea formaldehyde condensation products which are resistant to weathering and boiling water by the addition of thiourea. The addition of considerable proportions of thiourea to urea formaldehyde condensation products of widely different proportions of urea and formaldehyde improves the resistance to weathering and to boiling water and increases plasticity to such an extent that a commercially useful molded product can readily be prepared. However, a molding composition containing much thiourea has a disadvantage of staining an ordinary steel mold so that the composition must be used in stainless steel or chromium plated molds. This is a serious disadvantage of such material, and it is my purpose to be able to make urea formaldehyde molding compositions without the use of thiourea (or at least use so little thiourea) that the molding composition so made will not stain the mold.

In my U. S. Patent No. 1,893,911, I have shown how to obtain a clear transparent product by adding urea in a proportion greater than 1.1 moles of urea to 2 moles of formaldehyde. The transmission of ultraviolet light of this product and the weather resistance increasing as the urea proportions was increased until they reached a maximum when 1.33 moles of urea was used.

When the clear intermediate liquid product obtained according to the process of said patent was used together with fillers such as asbestos, chalk, plaster of Paris, casein, and like fillers, to prepare a molding composition which by heat and pressure was converted into an infusible molded product, it was found that these products were not suitable for commercial use for various reasons. They either lacked strength, translucency, resistance to boiling water or weather, or were blistered or else the molding composition itself lacked proper plasticity or flow in the hot mold. Only when the liquid product above (i. e., one containing from 1.1 to 1.33 moles of urea to 2 of formaldehyde) was combined with a cellulose material, such as paper, paper pulp, alpha cellulose, cotton, sawdust, linters, cloth, etc., were all of the above objections overcome. The molding composition could be made so that it readily flowed in the hot mold without blistering and the molded compound strong, translucent and resistant to weathering and to boiling water. It was found that molding compositions of substantially similar properties could be prepared by using the same ratio of urea to formaldehyde as an impregnating medium without it being necessary to start with a transparent, clear, intermediate solution. Although the preferred embodiment with cellulose material was 1.33 moles of urea to 2 moles of formaldehyde, in my prior application, Serial No. 363,397, I disclosed the improved products resulting from 1.05 to 1.40 moles of urea to 2 moles of formaldehyde.

The upper limit, i. e., 1.40 moles of urea, is determined by the method of carrying out the invention. In the following example the solution of urea and formaldehyde is boiled for a time and under such conditions that it is not desirable to add more than 1.40 moles of urea as too much of an amorphous precipitate will be formed cutting down the plasticity of the molding composition and the strength of the molded product. If more than 1.40 moles of urea are gradually added in small portions to 2 moles of formaldehyde in order to form the maximum amount of dimethylol urea, such as is done in a general way in the process of my Patent No. 1,893,911, a satisfactory product can be obtained even though the impregnating solution is clouded. Still another way of preparing a satisfactory molding composition and molded product containing a greater proportion than 1.40 moles of urea to 2 moles of formaldehyde is by reacting at a low temperature, such procedure being described in another portion of this specification. Processes using mixtures of formaldehyde and urea in the ratio of 2 to 1.25-1.40 may be easily controlled to avoid an excess of such precipitant, and hence molding compositions of good flowing qualities are obtained leading to high quality molded products.

I have found that by combining a cellulose material such, for instance, as paper, cellulose, paper pulp, sawdust, linters, cotton, cloth, etc., with the urea formaldehyde condensation product above set forth, I am enabled to produce a materially improved molding composition which will be non-inflammable and in which the water absorption will be at a minimum.

By submitting this molding composition after it has been dried to the combined action of heat and pressure as, for instance, by utilizing the well-known molding process and apparatus common in the art of molding phenol formaldehyde compositions, the cellulose material, according to several authorities, goes into solution with the condensation product to form an integral part thereof. The cellulose material greatly increases the strength and durability of the molded product. This molded product remains translucent even when the amount by weight of the cellulose material is more than one-half of the whole product.

It is immaterial in the final molded product whether the urea formaldehyde condensation product is combined with powdered cellulose material or whether cellulose fibre sheets are impregnated with the urea formaldehyde condensation product. In both instances the combined action of heat and pressure in the molding operation causes the product to become quickly homogeneous.

Colored effects may be obtained in the molded product. For instance, the cellulose material may be previously colored and then combined with the urea formaldehyde condensation product. Or the initial condensation product may be colored. Or the color may be introduced at any time during the process. Vari-colored effects in the molded product may also be obtained as, for instance, by coloring two of the molding compositions differently and then combining them under the combined action of heat and pressure.

A suitable pigment or modifying agent, such as asbestos, lithopone, china, clay or talc, may be introduced at any time during the process, if so desired.

The following are examples of methods by which the uncolored molding composition may be prepared and molded:

Example 1.—225 grams of urea were refluxed with 450 cc. of a neutral solution of 40% formaldehyde. The solution becomes milky immediately after boiling. Boiling is continued for one hour, after which the reaction product is mixed with 150 grams of powdered paper pulp. The mixture is then dried and the composition molded under a pressure of from a ton to a ton and a half per square inch and at a temperature of from 140° C. to 165° C. for from three to six minutes.

Example 2.—The urea formaldehyde condensation product solution of Example 1 is used to impregnate paper fibre sheets. These impregnated sheets are subjected to the combined action of heat and pressure, as set forth in Example 1, to produce the molded product.

Example 3.—The paper fibre sheets are impregnated with urea formaldehyde condensation product solution as in Example 2. These so impregnated sheets are broken up or pulverized before being subjected to the combined action of heat and pressure, as set forth in Example 1.

There are five factors, the combination of which give my improved composition and molded product, as follows:

1. Lower proportion of formaldehyde than used in the prior art and thus a more water resistant product.
2. Presence of paper or other cellulose material as a strengthening agent.
3. Proper plasticity of molding composition.
4. Production of finished article in a mold by the combined action of heat and pressure under proper conditions, instead of being poured into a mold and subsequently hardened by the action of heat.
5. Making the molding composition without the use of thiourea or with the use of so little thiourea that the molding composition does not stain ordinary steel molds. This eliminates the necessity of stainless steel or plated molds.

Factor 1: The product having the greatest resistance to water and solvents is made by using the reaction product of 1.33 moles of urea with 2 moles of formaldehyde. Although this is the ratio of urea and formaldehyde to get the best results, other ratios on either side can be used to give products of commercial value. Thus, I have disclosed the range of 1.05 to 1.40 moles of urea to 2 moles of formaldehyde, although more urea may be employed as hereinbefore stated.

Factor 2: Without paper or other suitable cellulose material as a strengthening agent, the molded product produced by the processes hereinbefore described is not of sufficient strength to be commercially valuable. The presence of paper or other suitable cellulose materials being lower in cost than other materials, reduces the cost of the final product.

When the cellulose material is added in the proper amount, in addition to adding strength and lowering the cost of the final product, it performs still another function. When a urea formaldehyde molding composition which does not contain a cellulose material is molded under heat and pressure, considerable amounts of volatile matter, mostly moisture, usually is given off. This moisture forms gas pockets and causes the molded product to be blistered. If a cellulose-free composition is dried before molding until most of the moisture otherwise liberated during molding is given up, it will not "flow" in the hot press. If cellulose material is added to the composition it will take up most of the moisture, due to its absorptive property, so that a final molded product without blisters is obtained from a composition which has the proper "flow."

Factor 3: In order to obtain a commercially usable molding composition it is necessary that it have sufficient plasticity or "flow" so that it can be molded under approximately the same conditions as are used in the molding of phenol-formaldehyde molding compositions. It is also necessary for commercial reasons that the composition retain its plasticity more or less permanently. Plasticity is bound up with the colloidal nature of the condensation product; apparently the larger the colloidal particle the greater the plasticity and vice versa. If acids, such as sulphuric or hydrochloric or weaker acids, if used in larger amounts, are used to catalyze the reaction of the urea and formalin and cause a rapid setting action, the resulting product will be useless as a commercial molding composition because the plasticity of the dried composition will be very low. This undesirable result is due to the rapid precipitation which does not allow time for the formation of large colloidal particles, instead forming small, finely divided amorphous ones. It is necessary that the composition be of proper acidity (pH) in order to have and retain its plasticity.

Strong heating of a molding composition in order to react the urea and formaldehyde or dry it, such as done by some of the prior workers, also destroys the plasticity of the molding composition so that it is not fit for commercial use. In one case the molding composition was dried at 120° C. for 18 hours. The loss of vapor or volatile materials of a plastic urea formaldehyde molding composition when heated at 120° C. may be as much as 15% in some cases. After drying at 120° C. for one-half hour it is scarcely usable under ordinary molding conditions, while when dried for 18 hours the composition is completely useless as a plastic material for molding.

Factor 4: Without molding in a hot press under hydraulic pressure it would be impossible to obtain a product which would be as commercially desirable as pouring in a mold and subsequently hardening by the action of heat. The former is a question of minutes while the latter is a question of days and weeks. Without hot molding in a hydraulic press sufficient cellulose material cannot be used to give the required strength to the final product.

Factor 5: The absence of thiourea or the use of so little thiourea that the molding composition does not stain ordinary steel molds, has enormously improved the commercial desirability of my molding composition.

Although other prior workers teach that intermediate urea formaldehyde condensation products can be mixed with pulverulent or fibrous materials, such as wood, pulp, and hot molded under pressure, they do not show the proportion of urea, formaldehyde and cellulose material necessary for a commercially possible product, nor the process required to make a sufficiently plastic material so that a homogeneous material is obtained in which the cellulose material has apparently dissolved. Nor do they point out the advantage of cellulosic material over other pulverulent or fibrous materials. Others have shown correct proportions of urea and formaldehyde for the preparations of glass like materials but have shown incorrect ratio for the preparation of molding compositions. Although condensation products have been prepared by others making use of some of the above factors in making a product, none has used the combination of these factors to produce the new product shown.

I do not wish to limit myself to the exact procedure in mixing the proportions given of urea and formaldehyde and cellulose material as it is obvious that different methods may be employed. Below are given examples of the ways in which the given proportions of urea and formaldehyde may be reacted.

1. Urea and formaldehyde may be reacted in aqueous solution and the solution used as an impregnating medium for the cellulose material. (Shown in example.)

2. An excess of formaldehyde is reacted with the urea and the dry urea added to the dried molding composition containing cellulose materials. The manner in which the added urea is employed, its quantity and its function is disclosed in detail in applicant's copending application Ser. No. 664,207.

3. Urea is gradually added to a formaldehyde solution until the proportion given is reached, and then the resulting mass is combined with the cellulose material.

4. A urea-rich urea-formaldehyde solution is added to a formaldehyde-rich urea-formaldehyde solution or vice versa, and then the resulting mass is combined with the cellulose material.

5. Formaldehyde is added to molten urea or a solution of urea until the required proportion is reached and the mixture is then combined with the cellulose material.

The process of drying is very important. If a molding composition is not sufficiently dry before being placed in a pebble mill or other grinding apparatus it will cause much trouble by "gumming up." If it is dried too far it will not flow properly in the mold. Several methods of drying have been proposed in the prior art. One method is to place the composition in a heated vacuum oven or drying apparatus. Another method is to place the composition on trays and blow hot air over it until dry. A disadvantage of the vacuum method is that the heat conduction through a urea formaldehyde condensation product containing a large amount of cellulose composition is very poor and the material is liable to be too dry where the heat comes in contact with the composition, i. e., on the bottom or top of the trays. In the other method, the disadvantage is that the top of the trays will be too dry while the bottom will not be sufficiently dry. The method of drying as outlined in the instant application, which method consists in blowing air, or other inert gases through the mixture, overcomes these disadvantages and helps to produce a composition of proper plasticity and acidity (pH).

Commercial formaldehyde usually contains enough formic acid to give a pH of approximately 3.0. The presence of any acid in a urea formaldehyde mixture catalyses the reaction between the two, the speed of the reaction is in proportion to the acidity or the pH of the solution. The reactions in a mixture having a pH of 3.0 usually go so fast that the products are worthless. In order to control the reaction it is run under mildly acid conditions, usually from 5 to 7. Any pH below 7 is on the acid side and thus there is present an acid catalyst.

Although it is desirable to have the molding composition on the acid side because the cure in the mold is shortened, a neutral or basic molding composition can be dried by blowing air through it and later made acidic during the grinding process.

A detail example of preparing and drying a molding composition by means of air blown through the mixture follows.

100 lbs. of urea were dissolved in 218 lbs. of commercial formalin solution containing 38% by weight of formaldehyde. After all the urea was added the temperature dropped to 6° C. Sufficient ammonium hydroxide was then added to bring the mixture to a pH value of 6.5. After bringing the temperature to 25° C. (room temperature) it was let stand for one-half hour. The solution was then mixed or shredded with 80 lbs. of sheeted alpha fibre (an absorbent and loosely compressed form of paper containing a high proportion of alpha cellulose) until the sheets were broken down. The wet fibrous material was placed uniformly on a 10 mesh screen fitted in a dryer so that a large volume of air was forced through the screen and the material. The screen was approximately 75 by 70 inches and the volume of air blown through was roughly 2,000 cubic feet a minute. The dryer was arranged with an outlet, so that all or little of the air could be re-circulated. At first air was blown through the material with the vent kept open so that little of the air would be re-circulated. Then heat was applied to the coils through which the air passed, and as the drying proceeded the vents were partially closed. The temperature recorded in the material varied from 30° C. at the start until it reached as high as 50-60° C. at the finish. Care had to be taken that the material would not get too stiff so that it could not be properly molded or that the material was sufficiently dry so that it could be properly ground without "gumming up" the mill. The pH of distilled water extract of the final material was found to be approximately 6.5. Due to the presence of some material which rapidly decomposed in the presence of water the pH value rapidly went to a pH of roughly 8.0.

The method of taking the pH of the molding powder composition is as follows: 5 grams of the molding composition were mixed with 10 cc. of distilled water, filtered as quickly as possible and a few drops of Brom Thymol Blue added to the filtrate. One minute after pouring into the filter the filtrate gave a color showing the pH was 6.6; upon standing the pH increases to 7.7 and above after ten minutes.

Most of the volatile acids were carried out by the air blown through the composition. This is advantageous because little acid is then present, thus little or no sodium hydroxide, ammonium hydroxide, or other bases are required to neutralize the formic acid, so that there is present none or at least the minimum amount of those salts which affect either the stability or the cure in the mold.

In my application Serial No. 422,545 I disclose that a superior molding composition can be obtained by partially drying a catalyst-containing urea formaldehyde product in the presence of a suitable "support," as, for instance, any of the materials hereinafter mentioned, at a normal temperature and thereafter heating the composition to complete the drying operation. By this partial drying operation before the heat is applied, the amount of water in the composition is materially decreased and the composition is thus rendered less sensitive to the action of heat during the drying operation even though a comparatively large amount of the acid catalyst is present.

In practice, I take the acid-catalyst-containing urea formaldehyde condensation product in the presence of the desired "support" such as, for instance, paper, cotton, asbestos or any broken solid material as pearl shell chips or flakes, and subject the same to the action of a blast of air or other inert gas at a normal temperature, say, below 50° C. by passing the air or other inert gas over or through the composition until the composition is partially dried. I thereafter subject the partially dried composition to the action of heat to complete the drying operation.

The great improvement which I have noted in the composition by utilizing the step of partially drying the composition at a normal temperature and thereafter heating the composition to complete the drying operation may arise either from the elimination of deleterious compounds from the composition by the air or other inert gas, or by the formation of helpful compounds because of the introduction of the air or other inert gas, at a normal temperature.

In the preparation of a molding composition from urea and formaldehyde, it has heretofore been difficult to control the extent of the reaction or the "flow" of the composition in the mold because of lack of control and the varying amount of catalyst, the varying temperature, the time used in drying, etc.

I have discovered a method whereby a uniform condensation product of great strength and durability may be obtained in a very simple way, which method consists in producing a molding composition by the reaction of urea and formaldehyde at a temperature below boiling, preferably below 75° C. This is done by carrying out the greater part, or all, of the reaction between urea and formaldehyde in the presence of a filler during the drying process. The advantage of this method is that the urea-formaldehyde condensation product is in the form of a thin liquid, which is easily mixed with the filler, as, for instance, paper. This is not true of the viscous and gelatinized products of the prior art. If paper is used and it is impregnated with the thin liquid of the present process, the moist paper is very absorbent of the thin liquid and can then be very readily broken up and dried without any expensive mixing or masticating process. This process is especially adapted for use in laminated work, as the solution of the urea and formaldehyde can be used to impregnate sheets of material and the reaction is carried on during the drying process. The dried sheets are then molded together under heat and pressure. Another advantage of this process is that the reaction is carried on in such a way that a more potentially reactive mixture can be used, i. e., a more acidic solution of urea and formaldehyde, or more catalyst can be present. By using the same solutions which are acid and those which contain a large amount of catalyst and carrying on the reaction the way it has been disclosed in previous patents, i. e., by heating to boiling, the reaction would be very violent, and hard or viscous condensation products obtained. These condensation products could be mixed with the fillers only with difficulty, and they were very difficult to mold. Another advantage of the instant process is that during the drying process the heat generated by the reaction helps in evaporating the water and thus cuts down the time of drying. Then, too, by carrying out the reaction during the drying process, water is taken off as the reaction proceeds and it appears that the less water present the more stable is the composition during the drying process. Instead of paper, I can use other cellulose fillers such as cotton, cotton cloth, silk, rayon, canvas, sawdust, wood flour, etc.

*Example 1.*—A urea-formaldehyde mixture in the mole ratio of 1.25 to 2, respectively, was reacted in the presence of ammonia or other base in a quantity sufficient to bring the hydrogen ion concentration of the solution to a pH of 6.5 and this solution was held at about 30° C. for about thirty minutes. The formaldehyde used (commercial formalin) was in the form of a solution containing 40% by volume. It was then mixed with paper (alpha fibre in sheet form) to give 40% on the dry weight and subjected at once to a stream of dry air for some hours at normal temperature. When sufficient water was removed the material was heated to a higher temperature until dry. I have found that material so produced is uniform in its properties.

*Example 2.*—The same proportional mixture as above was used but no basic substances were added in order to change the acidity of the formaldehyde from the original pH of 3.0. The pH of the solution on the addition of the urea was 4.6. This solution was then mixed with the alpha fibre paper and dried as above. The presence of the unneutralized acid caused a quicker curing action when the dried mass was subjected to heat and pressure in the mold.

The composition was finally subjected in the mold to the action of heat and pressure. The high temperature, preferably between 125° C. and 145° C., continued the process that was retarded by the low temperature of the preparation process described.

The above procedure yields a uniform product that is high in final infusible insoluble material and low in free formaldehyde, both of which are factors that determine the strength and the resistance to water absorption.

Instead of letting the solution stand at a temperature of 30° C. for a time, it can be mixed with the paper fibres immediately after the urea is dissolved in the formalin and the wet mass allowed to stand over night. Alternatively, after keeping the solution at 30° C. for half an hour, it is then mixed with the paper and let stand over night before drying in order to allow the reaction to continue. It is advisable to keep the wet fibrous mixture spread in fairly thin layers so that the heat of the reaction is dissipated in the air. If it is not spread out, the heat of reaction will raise the temperature of the mass and accelerate the reaction with the result that an undesirable solid cake will be formed. In any event after the mixture has stood some time it is desirable to disintegrate the mass and further mix it, e. g., by running in a mixer or masticator.

When the reaction of urea and formaldehyde is carried out at low temperatures a greater proportion than 1.40 moles of urea can be added to the 2 moles of formaldehyde and still obtain a molded product of sufficient strength and stability. Apparently a greater proportion of urea present during the boiling of the product forms a considerable amount of amorphous methylene urea, which acts as a filler and thus cuts down the plasticity of the molding composition and the strength of the molded product. When carried out at low temperatures the reverse is true apparently because the course of the reaction is altered.

The more acidic a molding composition the quicker will be the curing time in the mold. On the other hand the more acidic a composition the more it "stiffens" or cures on standing. I have found that the ideal molding composition is one which is neutral or slightly acidic and during the molding operation it becomes more acidic. That is, the dry molding composition should have a pH value between 6 and 7, preferably 6.5, but never less than 5.8. If the pH of the powder is less than 5.8 it will tend to become stiff on standing. If the pH value is greater than 7 the composition will not cure as rapidly. Apparently having a pH greater than 7 does not appreciably affect its stability.

If ammonia (as ammonium hydroxide) is used to neutralize commercial formalin and the neutralized solution is reacted with the urea by boiling, at first the pH will be found to increase quickly to a value greater than 7.7, i. e., quite alkaline, then it becomes acid, i. e., pH less than 6.1.

If instead of boiling the mixture with ammonia it is kept at about 30° C. there is no appreciable change in the pH. In one embodiment of the invention I react the ammonia mixture at a low temperature, and obtain a material which is slightly acidic, but which on curing in the mold becomes more acidic.

On boiling a mixture of urea and formaldehyde which has been neutralized with the strong bases, such as NaOH or KOH the mixture does not become more acidic on boiling as is the case with the ammonia.

I can obtain about the same results using strong bases instead of the ammonia simply by first neutralizing with NaOH or KOH and then adding a substance which while not strongly acid in itself (or can be neutralized so as not to be so) but on which being placed in the mold under heat and pressure becomes more acidic.

Substances which I have found to be particularly useful in this connection are the salts of chlor acetic acid.

The essential part of this embodiment of my invention is to carry out the reaction at such a temperature that the easily decomposed potentially acidic substances will not become acid or too acid before being placed in the mold under heat and pressure. The low temperature of the reaction and drying process represses the formation of acidic substances (hydrolysis) while the high temperature of the hot molding operation increases the production of the acid substances.

In accordance with another of my inventions set forth in application Serial No. 429,202, a method whereby a uniform condensation product of great strength and durability may be obtained in a very simple way is disclosed, which method consists in producing a molding composition by reacting urea and formaldehyde at a controlled temperature below 100° C. in the presence of substances which, at elevated temperatures, will hydrolize in solution or react with the free formaldehyde to yield free hydrogen ions. These substances may be ammonia; ammonium salts; salts which hydrolize in solution to yield free hydrogen ions, such as zinc chloride; water soluble esters, such as methyl formate; and organic compounds, such as formamide.

Commercial formaldehyde usually contains acidic material, mostly formic acid, in sufficient quantity to establish a hydrogen ion concentration of pH 3. This concentration of acidic catalyst is sufficiently high to carry the reaction so rapidly that the product is of little value. Ammonia is therefore added to reduce the acidity from a concentration of pH 3 to between pH 4 and 7.5. Now I have found that no apparent change occurs if formaldehyde with added ammonia remains at normal temperature. However, above 40° C. a reaction occurs, the rate of which increases with increase of temperature. The hydrogen ion concentration is observed to change slowly at first, then rapidly, and then more slowly. The rate of change depends on the temperature and the hydrogen ion concentration of the original formaldehyde ammonia solution. The same phenomena were observed when the formaldehyde ammonia solution contained the proper amount of urea desired for the condensation. It is believed that the ammonia reacts with free formaldehyde with the formation of hexamethylenetetramine and the consequent liberation of the original formic acid, thus increasing the hydrogen ion concentration. This increasing catalyst hydrogen ion accelerates the formation of the final products with the consequent liberation of formaldehyde. The formaldehyde thus produced reacts with any ammonia or urea that might be present. The control of the temperature of this reacting mixture makes possible a great improvement in the process and in the quality and uniformity of the molding composition.

I have made a urea formaldehyde mixture in the mole ratio of 1.25 to 2 respectively with ammonia added to bring the hydrogen ion concentration of the solution to pH 6.5 and have held this solution at about 30° C. for about thirty minutes. It was then mixed with paper or other filler and subjected at once to a stream of dry air for some hours at normal temperature. When sufficient water is removed the material can be heated to a higher temperature until dry. I have found that material so produced is uniform in its properties.

When other substances than ammonia or ammonium salts are used to give free hydrogen ions and thus catalyze the reaction, the original acidity of the formaldehyde solution can be reduced by the use of sodium hydroxide or other alkalines.

The composition is finally subjected in the mold to the action of heat and pressure. The high temperature, say between 125° C. and 180° C. continues the process that was retarded by the low temperature of the preparation process described with the formation of hexamethylenetetramine and consequently rapid increase in the amount of acid catalyst present. Hence, an initial good flow is obtained. In case a salt of ammonia and a stronger acid than formic acid such as HCL is added, with the proper adjustment of the hydrogen ion as described above, to give satisfactory hydrogen ion concentration as before, i. e., between pH 4 and pH 7.5, then the formation of hexamethylenetetramine results in the liberation of the stronger acid and the consequent more rapid increase in hydrogen ion results in a shorter curing time.

The above procedure yields a uniform product that is high in final infusible insoluble material and low in free formaldehyde both of which are factors that determine the strength and the resistance to water absorption.

The practice of the invention of the instant application leads to the substantial removal not only of the water physically combined in the mass but also the water chemically combined before the product is molded or otherwise processed.

According to the prior art the reaction between urea and formaldehyde can be roughly divided into three stages, the condensation stage, the polymerization stage, and the hardening stage. (See Ripper U. S. Pat. No. 1,687,312, page 1, line 3.) The condensation stage is usually completed after a comparatively short reaction of urea and formaldehyde, either boiling of the reactants or use of a lower temperature for a correspondingly longer time. Prior workers have shown that the polymerization stage is usually a prolonged one and is usually conducted by boiling. The viscosity gradually rises as boiling is continued until the product does not become cloudy on cooling. For the manufacture of glass-like materials the product is then vacuum distilled so as to remove as much water as possible before being cast. The hardening stage is the one in which the casting liquid is changed in the mold into the final infusible insoluble material. This is accomplished by heating either with or without pressure.

In copending application No. 429,202, hereinbefore referred to, I show how to make a superior urea formaldehyde molding composition by reacting urea and formaldehyde so as not to carry it beyond the condensation stage and then simultaneously carrying on the reaction and drying. This is done by reacting urea and formaldehyde at a low temperature in the presence of potentially acid substances and removing water that is present or formed at a low temperature simultaneously with the reaction. The final polymerization or hardening stage is carried out at a higher temperature in the substantial absence of water partly by blowing heated air through the composition but mostly during the molding under heat and pressure.

In accordance with an embodiment of the present invention, the reaction is not carried beyond the condensation stage before the water is begun to be taken off, and proceeds in such a manner that as much of the water present or formed is removed as soon as possible either before or during the reaction and drying process. A potentially acidic substance is used so as to permit the initial pH value to be sufficiently high that the product will remain clear and yet furnish additional acid to speed up the polymerization and hardening stage. During the condensation period I have shown in my U. S. Patent No. 1,893,911 and in application No. 429,202 that a pH value above 4 must be used in order to obtain a clear transparent product. Otherwise if the reacting solution has a pH value of less than 4 the product will be milky or cloudy. This result is due to the fact that with such a pH value the reaction will proceed so fast that a proper time is not allowed for the formation of a colloidal solution, and instead the product will tend to precipitate and will form a cloudy solution. Instead of using a potentially acidic substance, the condensation can be carried out in either acid, neutral or basic medium just so that the pH value is above 4, and after the initial condensation is effected either preferably adding an acid catalyst (acids, acidic salts, and acidic substances) or alternatively maintaining the polymerization stage on the acid side.

In preparing condensation products of urea and formaldehyde, the reaction stage is comparatively short. Instead of using a low temperature (30° C.) for a comparatively longer time as is done in the above specification, it has been found that the same results can be obtained by using a higher temperature for the reaction, provided the higher temperature is compensated for by a shorter period of reaction time. In my U. S. Patent No. 1,893,911 I show that the reaction state is probably represented by the formation of dimethylol urea. This is obtained by boiling the urea and formaldehyde for a few minutes. Anyhow the first stage can be eliminated if instead of starting with urea and formaldehyde dimethylol urea is used. It can be reacted and the water taken off as it is formed in the presence of an acid catalyst, with or without additional urea being added to react with the formaldehyde as it is formed, to give improved products.

It is very important that the proper amount of acids be used during the second or polymerization stage of the reaction. For some purposes such as the preparation of glass-like materials, it is desirable to have as much acid present during the polymerization as possible because the greater the amount present the quicker will be polymerization and hardening stages. However, if a stable intermediate product which must be kept for some time is desired, too much of an acid catalyst cannot be left in the final product. For example, molding compositions must be prepared so that the reaction will not appreciably continue during storage or transit and the composition not lose its original plasticity. Again it is desirable to have stable solutions for use as lacquers or cements which must keep for long periods of time without gelatinizing. In both of the above cases it is desirable to have the pH on the acid side but as near the neutral point as possible say pH 6.5. If a larger amount of acid catalyst is present it must be neutralized to give such a pH value.

After the initial reaction and during the drying if a large amount of acid is present it is essential that as little water as possible be present, for otherwise the acid will have a tendency to cause premature gelatinization. In the absence of water the composition is rendered less sensitive to the action of heat even though a comparatively large amount of acid catalyst is present. It is a purpose of this embodiment of the invention to have as little water present as possible during the polymerization stage so that instead of gelatinizing, the product will more or less solidify substantially without any or with very little water. The presence of acid substances or catalysts aid in the polymerization and splitting off of water. If there is too much catalyst present the condensation product will gelatinize before all the water is removed, while if the solution is not sufficiently acid the final product obtained will be cloudy or milky. Therefore if the right conditions are employed the final product, without fillers, will be clear and transparent. For some uses, an absolutely clear product is not necessary and, furthermore, if approximate conditions herein set forth are observed, the final material, although milky, may be of superior physical properties. Ammonium salts are particularly useful for carrying out the invention because they tend to keep the solution first at a high pH value during the condensation, then become the more acid on heating, such acidity being just the right rate so that a clear transparent final product can be prepared with ease.

In carrying out this invention it is preferable to use a proportion greater than 1.05 moles of urea to 2 moles of formaldehyde. Alhough it is easier to obtain clear transparent products by the use of lower proportions of urea than 1.05 moles of urea to 2 moles of formaldehyde, the final products will not be as chemically resistant nor as strong. It is possible, however, to start with a smaller proportion of urea and use conditions of reaction and drying under which the excess formaldehyde would be driven off. Such conditions would for example be attained in which the vacuum distillation is carried out by using a high temperature in the bath and a moderately high vacuum. Such a vacuum method is a convenient way of carrying out the process of the present invention. By using the method outlined in the present application, it is possible to use a ratio of 1 mole of urea with 1.5 moles of formaldehyde and obtain a clear transparent product.

The difference between this invention and the usual prior procedure is that in the prior process the polymerization or second stage is carried out by boiling or reacting the condensation product before the water is removed, whereas in the present invention as much of the solvent water and that formed by reaction is taken off as soon as possible before or during the reaction and drying process. As hereinbefore explained, one method of removing the water from the product prepared according to the methods disclosed herein is to blow air through the condensation product first at a normal temperature so as to substantially dry it, then heating the air blown through in order to complete the drying operation.

Obviously a convenient method of blowing air through the composition is to spread it on a screen or a sieve. It is advantageous to have some means of controlling the humidity of the air used in order to insure uniformity. Some means should also be provided for heating the air and it is advantageous to circulate at least some of the heated air so a minimum of heat is required. Of course, the larger the volume of air or the thinner the material is spread on the screen or sieve, the shorter will be the drying time. A detailed example of carrying out the above drying process has already been given herein.

Other methods of drying include vacuum, drum, or spray drying. Since drying and polymerization must proceed simultaneously, the method of drying will determine the amount of catalyst which should be used. Vacuum drying is a much faster process than drying at atmospheric pressure or at ordinary temperatures, so that therefore a greater amount of catalyst should be used. Spray drying is a still faster method and thus a still greater amount of catalyst can be used.

Because of the absence of any appreciable amounts of water in the product before being converted into the solid condition, many plasticizers or modifying agents are soluble in it. The advantages of using such a water-free material, either with or without plasticizers or modifying agents is set forth in my copending application No. 664,208, filed April 3, 1933.

In this prior application I disclose a method of removing water from an acid condensation product of urea and formaldehyde at a low temperature in such manner that the reaction will not progress too far before the water is removed. By this partial drying operation, that is by blowing air at ordinary temperatures to partially dry the mass before heat is applied, the amount of water in the composition is materially decreased and the composition thus rendered less sensitive to the action of heat during the drying operation even though a comparatively large amount of an acid catalyst is present.

Instead of urea, substitution products of urea may be used in so far as they are not specifically limited, all of which I wish to be included along with urea in the designation "urea" used in the following claims. The formaldehyde may be used either in the commercial aqueous solution or in the gaseous state or in the form of a solution of anhydrous formaldehyde or in the form of the polymers.

Thus while I have described my improvement in detail and with respect to certain preferred forms, I do not desire to be limited to such details or forms since, as will be noticed by those skilled in the art, after understanding my invention, many changes and modifications may be made and the invention embodied in widely different forms without departing from the spirit and scope thereof in its broader aspects, and I desire to cover all modifications, forms and improvements coming within the scope of any one or more of the appended claims.

This application is a continuation in part of applications Serial No. 242,520, filed December 24, 1927, now Patent No. 1,893,911; Serial No. 363,397, filed May 15, 1929, Serial No. 422,545, filed January 22, 1930; Serial No. 429,202, filed February 17, 1930; Serial No. 537,998, filed May 16, 1931, now Patent No. 2,140,560; Serial No. 664,207, filed April 3, 1933, now Patent No. 2,329,172; Serial No. 664,208, filed April 3, 1933; and Serial No. 684,561, filed August 10, 1933, now Patent No. 2,140,561.

Having thus described my invention, what I claim as new and desire to secure by Letters Patent is:

1. The process of producing urea formaldehyde molding compositions which do not stain ordinary steel molds, which comprises mixing substantially neutralized aqueous formaldhyde solution and urea in a proportion of 2 mols of formaldehyde to more than 1.05 of urea but not substantially in excess of 1.40 mols, reacting the mass under the resulting hydrogen ion concentration, mixing the resulting reacted liquid with a cellulose filler, drying the mass to remove the water present, thereby forming a dry substantially neutral molding composition capable of being molded at a ton to a ton and half per square inch and at a temperature of from 140° C. to 165° C. for from 3 to 6 minutes, to form a translucent, strong, durable, molded product.

2. The process of producing urea formaldehyde molding compositions which do not stain ordinary steel molds, which comprises reacting an aqueous formaldehyde solution and urea in a proportion of 2 mols of formaldehyde to more than 1.05 of urea but not substantially in excess of 1.40 mols, reacting the mass at a pH value of from 4 to 7, drying the reaction mass under substantially neutral conditions thereby retarding polymerization until substantially all of the water present from the beginning and that formed by the reaction is substantially removed before setting or gelatinization, mixing a cellulose filler with the reaction product while it is still in liquid condition, thereby forming a dry readily flowable molding composition capable of being molded at a ton to a ton and a half per square inch and at a temperature of from 140° C. to 165° C. for from 3 to 6 minutes, to form a translucent, strong, durable, molded product.

3. A pressure-shaped, heat-hardened, stable, translucent, strong, homogeneous, boiling water and weather resistant molded product which does not stain ordinary steel molds and derived by molding a substantially neutral molding composition consisting of the condensation product of about 1.25–1.40 mols of urea with 2 mols of formaldehyde obtained under mildly acid conditions, and a cellulose filler.

4. The process of manufacturing urea formaldehyde condensation products which do not stain ordinary steel molds, which comprises reacting urea and formaldehyde in solution, the urea content being in excess of 1.05 mols to 2 of formaldehyde but insufficient to form a voluminous white precipitate at an acid pH value in excess of 4 to effect initial condensation, then before any polymerization begins drying the reaction mass whereby the water of the original solution is removed and also the water liberated by the advancement of the reaction due to the acidity and the temperature existing during the drying operation before gelatinization can occur, and adding a cellulose filler before solidification, the dried product constituting a substantially neutral fusible mass capable of flowing to form a shaped product.

5. The process of producing urea formaldehyde condensation products of 2 mols of formaldehyde to within the range of 1.05 but not substantially in excess of 1.40 mols of urea which comprises reacting urea and formaldehyde in aqueous solution under mildly acid conditions and before there is a substantial change in viscosity, subjecting the reaction solution to a drying operation to remove the water of the original solution and continuing the drying to remove also the water liberated by the reaction in the presence of a cellulose filler before the water combines with the condensation product whereby the mass solidifies substantially in the absence of water rather than gelatinizing to give a substantially dry neutral composition which does not stain ordinary steel molds and capable of being molded under heat and pressure.

6. The process of manufacturing a dry, good flowing hot molding composition stable in storage and which does not stain ordinary steel molds, having pH value of about 6.5 and having urea combined with formaldehyde in a greater ratio than 1.05 mols to 2 mols but insufficient to form a voluminous white precipitate, and containing a potentially acidic substance, which comprises subjecting urea and formaldehyde to a mild condensation in acid solution and then subjecting the primary reaction product obtained to a drying operation at a mild temperature in the presence of a cellulose filler at which the water present from the beginning and that formed by the reaction is removed before gelatinization can occur, thereby forming a molding composition having stable flowing characteristics, which composition on heating in a mold above 125° C. flows readily in the beginning and then because of the presence of the potentially acidic substance which increases the acidity at this elevated temperature causes an acceleration of the reaction retarded at the lower temperature, thereby curing rapidly to give a final infusible, insoluble molded product.

7. The process of manufacturing a dry, good flowing molding composition which does not stain ordinary steel molds, stable in storage, having a pH value of about 6.5, which comprises reacting urea in excess of 1.05 mols with an acid solution of 2 mols of formaldehyde at a pH value in excess of 4, the proportion of urea being insufficient to form a voluminous white precipitate, mixing the said reaction solution before any polymerization has taken place with a cellulose filler, spreading the mixture and blowing an inert gas therethrough at a temperature at which most of the water present is removed before the polymerization reaction advances to any substantial extent and then blowing an inert gas at a higher temperature through the mass to remove the last traces of water which is not removed at the lower temperature, said drying operation serving to remove water of solution, water formed as the reaction progresses, formic acid and other deleterious substances before gelatinization can occur.

8. The process of manufacturing a dry, good flowing molding composition which does not stain ordinary steel molds, stable in storage, having a pH value of about 6.5, which comprises reacting urea in excess of 1.05 mols with an acid solution of 2 mols of formaldehyde, the proportion of urea being insufficient to form a voluminous white precipitate, at a pH value in excess of 4, mixing the said reaction solution before any polymerization has taken place with a cellulose filler, spreading the mixture and blowing an inert gas therethrough to remove the water of the original formaldehyde solution, the water formed by continuance of the reaction, and formic acid, before gelatinization occurs, whereby a slightly acid fusible molding composition is obtained.

9. The process of manufacturing fusible urea formaldehyde condensation products which do not stain ordinary steel molds having a pH of about 6.5, such fusibility being substantially permanent on storage, and having urea combined with formaldehyde in a greater ratio than 1.05 mols to 2 mols but insufficient to form a voluminous white precipitate, which comprises subjecting urea and formaldehyde in solution to a condensation under mild acidic conditions so as to prevent polymerization while water is present and subjecting the primary reaction product obtained to a drying operation in admixture with a cellulose filler at a mild temperature at which the water present from the beginning and that formed by the reaction are removed before gelatinization can occur and whereby polymerization is retarded, such removal of water serving to prevent polymerization which readily occurs in the presence of water under acid conditions and also serving to produce a condensation product stable at ordinary temperatures but which dried condensation product on heating readily takes the shape of the mold in the beginning, said heating causing an acceleration of the reaction retarded at the lower temperature to give a final infusible, insoluble product.

10. A molding composition which does not stain ordinary steel molds composed of a urea-formaldehyde condensation product and a cellulose filler, said composition being dry, plastic, capable of readily flowing at molding temperature and of being molded under a pressure of from a ton to a ton and a half per square inch and at a temperature of from 140° C. to 165° C. in from 3 to 6 minutes, said condensation product being substantially identical with that produced by the condensation of substantially neutralized aqueous formaldehyde and urea in the molar proportion of 2 of the former to 1.25 to 1.40 of the latter.

11. An improved, urea formaldehyde condensation product molding composition which does not stain ordinary steel molds, composed of a cellulose filler impregnated with a substantially neutral condensation product produced from urea and formaldehyde, the urea being present in a proportion of about 1.25 to 1.40 mols to each 2 mols of formaldehyde, said composition being readily moldable at a pressure of a ton to a ton and a half per square inch at a temperature of from 140° C. to 165° C. for from 3 to 6 minutes to give an infusible, homogeneous, boiling water resistant, translucent molded product, said molding characteristics being due to advancement of the condensation reaction of the urea and formaldehyde to an extent where such molding properties are retained.

12. The process which comprises forming a molding composition composed of a substantially neutral and dry condensation product of formaldehyde and urea, the molar proportions in the composition being 2 of the former to within the range of 1.05 to not substantially in excess of 1.40 of the latter, said composition containing a cellulose filler which takes up any water liberated during the molding to form blister-free products, capable of flowing readily upon being molded at a pressure of a ton to a ton and a half per square inch at a temperature of from 140° C. to 165° C. for from 3 to 6 minutes to form an infusible, homogeneous boiling water resistant, translucent molded product which does not stain ordinary steel molds, said condensation product being obtained by acid condensing urea and formaldehyde and drying with the aid of the cellulose filler until the water present from the beginning and that liberated by advancement of the reaction is substantially removed and the readily flowable composition is obtained.

13. The process of manufacturing urea formaldehyde condensation products which does not stain ordinary steel molds, which comprises reacting urea and formaldehyde in solution, the urea content being in excess of 1.05 mols to 2 of formaldehyde but not substantially in excess of 1.40 mols, at an acid pH value in excess of 4 to effect initial condensation, then before any polymerization begins mixing the reaction mass with a cellulose filler and evaporating out the water present with the aid of the filler without advancing the polymerization, the water evaporated being that of the original solution and also that liberated by the condensation reaction, the resulting dried product constituting a substantially neutral fusible mass capable of flowing to form a blister-free molded product in which water given up by the completion of the reaction is taken up by the cellulose filler.

14. A dry, readily flowing at molding temperatures, plastic, acid condensed, substantially neutral, urea-formaldehyde condensation product which does not stain ordinary steel molds, reacted to an extent at which flowing qualities are not destroyed, said molding composition containing a cellulose filler, and such flowing qualities being substantially permanent, such that the composition can be kept a substantial period of time until molded under heat and pressure, the molar ratio of formaldehyde to urea being 2 of the former to within the range of 1.05 to not substantially in excess of 1.40 of the latter, said composition being capable of flowing at a pressure of a ton to a ton and a half per square inch and curing in the mold in from three to six minutes at a temperature of 140° to 165° C. to form an insoluble, infusible material.

LEONARD SMIDTH.